United States Patent [19]

Hickmann

[11] Patent Number: 5,034,559
[45] Date of Patent: Jul. 23, 1991

[54] POLYETHERCARBOXYLIC ESTERS AND THEIR PREPARATION

[75] Inventor: Eckhard Hickmann, Dannstadt-Schauernheim, Fed. Rep. of Germany

[73] Assignee: BASF Aktiengesellschaft, Ludwigshafen, Fed. Rep. of Germany

[21] Appl. No.: 547,812

[22] Filed: Jul. 2, 1990

[30] Foreign Application Priority Data

Jul. 29, 1989 [DE] Fed. Rep. of Germany ....... 3925255

[51] Int. Cl.$^5$ ............................................. C07C 69/66
[52] U.S. Cl. .................................................. 560/180
[58] Field of Search ......................................... 560/180

[56] References Cited

U.S. PATENT DOCUMENTS 2,608,578 8/1952 Weesner ............................. 560/180

3,994,959 11/1976 Schneider ........................... 560/180

FOREIGN PATENT DOCUMENTS 235826 9/1987 European Pat. Off. .

OTHER PUBLICATIONS

P. Dreyfuss, Handbook of Elastomers, New Developments and Technology (1988), p 695.

Primary Examiner—Paul J. Killos
Attorney, Agent, or Firm—John H. Shurtleff

[57] ABSTRACT

Polyethercarboxylic esters of the formula

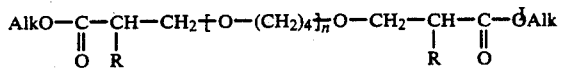

where Alk is alkyl of 1 to 8 carbon atoms, R is hydrogen or methyl and n is from 3 to 70.

4 Claims, No Drawings

POLYETHERCARBOXYLIC ESTERS AND THEIR PREPARATION

The present invention relates to novel polyethercarboxylic esters of the general formula

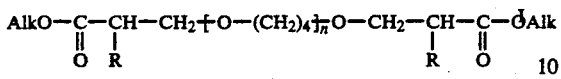

where Alk is alkyl of 1 to 8, preferably of 1 to 4, carbon atoms, R is hydrogen or methyl and n is from 3 to 70, and a process for their preparation.

The novel polyethercarboxylic esters of the formula I are bisalkoxycarbonylethylated polytetrahydrofurans, which are useful building blocks for polymers. Of particular industrial interest are the novel polyethercarboxylic esters of the formula

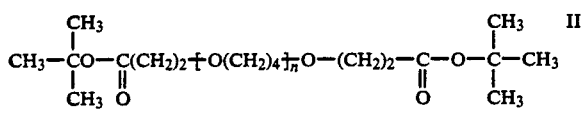

where n has the abovementioned meaning.

Polytetrahydrofurans of the general formula

(referred to below as PTHF) are prepared, for example, by cationic polymerization of tetrahydrofuran (referred to below as THF). In the structural formula III, the degree of polymerization n indicates the number of oxybutane-1,4-diyl units per molecule which are derived from the THF; n is usually from 3 (corresponding to a mean molecular weight $\overline{MW}$ of 234) to about 70 (corresponding to an $\overline{MW}$ of about 5,000). The degree of polymerization n or the mean molecular weight $\overline{MW}$ corresponding to this value, by means of which the PTHF mixtures obtainable in the polymerization of THF are characterized, can be determined, for example, by osmometric or titrimetric analyses. Of particular industrial interest are, for example, the following PTHF mixtures: PTHF 250 ($\overline{MW}$=about 250, $\bar{n}$=about 3), PTHF 650 ($\overline{MW}$=about 650, $\bar{n}$=about 9), PTHF 1000 ($\overline{MW}$=about 1000, $\bar{n}$=about 14), PTHF 2000 ($\overline{MW}$=about 2000, $\bar{n}$=about 27), PTHF 2900 ($\overline{MW}$=about 2900, $\bar{n}$=about 40) and PTHF 4500 ($\overline{MW}$=about 4500, $\bar{n}$=about 12).

Each of these PTHF mixtures contains a broad spectrum of PTHF homologs, the number of which is about 10–20 in the low molecular weight range and increases to more than 30 in the high molecular weight range.

PTHF is used as an α,ω-diol for the preparation of polymers. Because of its useful properties, PTHF is a building block for elastomeric and thermoplastic polymers (P. Dreyfuss, Handbook of Elastomers, New Developments and Technology, 1988, page 695).

PTHF is an α,ω-diol and its reactivity is therefore limited to the typical reactions of primary alcohols. There has therefore been no lack of attempts to change the reactivity of PTHF by modifying the terminal groups, in order to extend its potential range of applications. For example, the reaction of PTHF with diisocyanates in a molar ratio of 1:2 gives PTHF diurethanes having free, terminal isocyanate groups, and PTHF bis(meth)acrylates are obtained by transesterification of (meth)acrylates with PTHF. Such reactions with mixtures of PTHF homologs in turn give mixtures of homologous PTHF derivatives which likewise differ structurally only in the different number of repeating oxybutane-1,4-diyl units in the polyether chain.

Interestingly, a PTHF having the terminal groups —O—CH$_2$—CH$_2$—COOAlkyl (ie. a bisalkoxycarbonylethylated PTHF) has not yet been described.

The present invention relates to the novel polyethercarboxylic esters of the general formula I, in particular of the formula II and their preparation. In the process of the invention, the polyethercarboxylic esters are prepared by reacting a polytetrahydrofuran of the general formula

where n is from 3 to 70, with an acrylate of the general formula

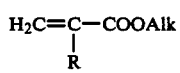

where Alk is alkyl of 1 to 8 carbon atoms and R is hydrogen or methyl, in the presence of a basic substance.

In the polytetrahydrofurans of the formula III which are to be reacted according to the invention, n is from 3 to 70, preferably from 4 to 40. In the acrylates of the formula IV, Alk is alkyl of 1 to 8, preferably 1 to 4, carbon atoms. Particularly suitable acrylates are the industrially readily available acrylates and methacrylates, such as the methyl, ethyl, n-butyl, isobutyl and 2-ethylhexyl esters of acrylic acid, methyl methacrylate and in particular tert-butyl acrylate.

Examples of suitable basic substances which are added as catalysts are potassium hydroxide, sodium hydroxide, alkali metal alcoholates, in particular tertiary alkali metal alcoholates, such as potassium tert-butoxide, quaternary ammonium compounds or quaternary phosphonium compounds. Particularly good results are obtained using quaternary ammonium hydroxides and quaternary phosphonium hydroxides. Quaternary ammonium or quaternary phosphonium hydroxides which are readily soluble in organic solvents, such as aliphatic and aromatic hydrocarbons, ethers, alcohols, tertiary amines, ketones and esters, are preferred. Examples are tetra-propyl-, tetra-n-butyl-, trioctylmethyl-, dodecyltrimethyl-, didodecyldimethyl-, hexadecyltrimethyl-, octadecyltrimethyl-, benzyltrimethyl-, benzyltriethyl- and dibenzyldimethyl-ammonium hydroxide, N-dodecyl- and 4-dimethylamino-N-hexadecylpyridinium hydroxide and trioctylmethyl-, hexadecyltrimethyl- and triphenylmethylphosphonium hydroxide. These lipophilic onium hydroxides can be used as such. However, they can also be produced in situ from lipophilic onium salts and metal hydroxides, such as an alkali metal hydroxide, eg. sodium hydroxide or potassium hydroxide, or a more strongly hydrophilic onium hydroxide, such as tetramethylammonium hydroxide or choline. The in situ preparation of ammonium and phosphonium hydroxides, having excellent catalytic activity, from the large number of industrially readily available quaternary ammonium and quaternary phosphonium chlorides, bromides, methosulfates, hydrogen sulfates, sulfates, formates and bicarbonates makes the novel process particularly widely applicable. Alcoholates and/or complexing agents for cations, for example crown ethers, polyethylene glycols and their ethers or TDA-1 ® (Rhône-Poulenc), can be added as cocatalysts.

The stated basic substances are usually used in amounts of from 0.01 to 10, preferably from 0.5 to 5, mol %, based on PTHF. They can be taken completely or partly at the beginning of the reaction and/or metered in continuously or batchwise during the reaction. It is sometimes advantageous to meter in catalysts subsequently in order to achieve a quantitative conversion.

The ratio of acrylate to PTHF can be chosen within wide limits. However, in order to achieve substantially complete conversion to the bis adduct, from 1.8 to 3, preferably from 2 to 2.5, moles of acrylate are used per mole of PTHF.

The reaction can be carried out in the presence of an organic solvent. Examples of suitable solvents are aliphatic or aromatic solvents, for example ethers, such as methyl tert-butyl ether, ethylene glycol dimethyl ether or tetrahydrofuran, tertiary amines, such as tributylamine, ketones, such as acetone or methyl ethyl ketone, and esters, such as methyl acetate. Alcohols are also suitable provided that their $pK_A$ value is > about 18, eg. tert butanol. However, the reaction is most advantageously carried out in the absence of a solvent.

The reaction components can be mixed continuously, for example in a stirred kettle cascade or in a loop reactor, or batchwise, for example in a stirred kettle. In the batchwise procedure, some or all of the PTHF, which may be in solution, is initially taken, and the acrylic ester and, where relevant, the remaining PTHF are added separately, or together as a solution. The reaction is usually carried out at from 0° to 100° C., preferably from 20° to 40° C.

EXAMPLE 1

Addition reaction of PTHF 250 with tert-butyl acrylate 154 g of tert-butyl acrylate are added dropwise to a mixture of 125 g of PTHF 250 (in which n=3) and 4.0 g of benzyltrimethylammonium hydroxide in the course of 4 h at from 22° to 30° C., while stirring. The reaction mixture is allowed to react for a further 4 h at about 30° C. It is then neutralized by adding solid carbon dioxide. After the low boilers have been stripped off in a rotary evaporator at a bath temperature of from 50° to 60° C., under reduced pressure from a water pump, 252 g of residue are obtained. According to the NMR spectrum, the residue has the following composition:
about 99 mol % of an adduct of the formula II in which n=3 about 1 mol % of PTHF.

The corresponding PTHF ester is not detectable. The mean molecular weight $\overline{MW}$ of the adduct, determined by osmometry in acetone as the solvent, is 500 (calculated: 506). Virtually exclusively the desired bis adduct of PTHF with the acrylate is formed.

EXAMPLE 2

Addition reaction of PTHF 650 with tert-butyl acrylate 28.2 g of tert-butyl acrylate are added dropwise to a mixture of 65.1 g of PTHF 650, 0.28 g of KOH and 1.6 g of tetra-n-butylammonium bromide in the course of 2 h at from 22° to 25° C., while stirring. The reaction mixture is allowed to react for a further 2 h at about 25° C. The mixture is then worked up as in Example 1, and 85.5 g of residue having the following composition are obtained:
about 98 mol % of an adduct of the formula II in which n=7
about 2 mol % of PTHF.

The corresponding PTHF ester is not detectable. The mean molecular weight $\overline{MW}$ of the adduct, determined by osmometry, is 870 (calculated: 906). In the in situ preparation of the quaternary ammonium salt which takes place in this Example, once again virtually only the desired bis adduct is formed.

EXAMPLES 3 TO 11

Polytetrahydrofurans having different mean molecular weights were reacted with tert-butyl acrylate, similarly to the procedures described in Examples 1 and 2. Details are given in the Tables below.

TABLE 1

| Example | PTHF $\overline{MW}$ | PTHF Amount (g) | Tert-butyl acrylate (g) | Catalyst Formula | Catalyst Amount (g) | Solvent | Solvent Amount (g) |
|---|---|---|---|---|---|---|---|
| 3 | 250 | 50 | 56.3 | $(n\text{-}C_4H_9)_4N^+OH^-$ KOH | 2.6 0.56 | — | — |
| 4 | 650 | 325 | 154 | $(C_6H_5CH_2)(CH_3)_3N^+OH^-$ | 4.0 | — | — |
| 5 | 650 | 13,000 | 6,200 | $(C_6H_5CH_2)(CH_3)_3N^+OH^-$ | 240 | | |
| 6 | 650 | 65.9 | 28.2 | $(n\text{-}C_4H_9)_4N^+OH^-$ | 1.4 | — | — |
| 7 | 1,000 | 200 | 61.6 | $(C_6H_5CH_2)(CH_3)_3N^+OH^-$ | 1.6 | THF | 200 |
| 8 | 1,000 | 15,000 | 4,300 | $(C_6H_5CH_2)(CH_3)_3N^+OH^-$ | 69 | THF | 15,000 |
| 9 | 2,000 | 200 | 61.6 | $(C_6H_5CH_2)(CH_3)_3N^+OH^-$ | 0.8 | THF | 200 |
| 10 | 250 | 12,500 | 14,100 | $(C_6H_5CH_2)(CH_3)_3N^+OH^-$ $(n\text{-}C_4H_9)_4N^+Br^-$ KOH | 200 160 140 | — | — |
| 11 | 250 | 50 | 56.3 | $(n\text{-}C_4H_9)_4N^+HSO_4^-$ KOH | 3.4 1.1 | — | — |

TABLE 2

| Example | Reaction temperature (°C.) | Reaction time (h) | Reaction product Amount (g) | Reaction product Composition (mol %) |
|---|---|---|---|---|
| 3 | 20–26 | 6.5 | 96.5 | 93 adduct II (n = 3) 2 PTHF 5 PTHF ester |
| 4 | 20–25 | 6 | | 98 adduct II (n = 7) 1 PTHF 1 PTHF ester |
| 5 | 22–28 | 40 | 18,100 | 97 adduct (n = 7) 2 PTHF 1 PTHF ester |
| 6 | 20–25 | 16 | 85.6 | 93 adduct (n = 7) 7 PTHF No PTHF ester |
| 7 | 23–26 | 5 | 241.2 | 95 adduct II (n = 12) 3 PTHF 2 PTHF ester |
| 8 | 20–30 | 22 | 18,800 | 97 adduct II (n = |

TABLE 2-continued

| Example | Reaction temperature (°C.) | Reaction time (h) | Reaction product Amount (g) | Reaction product Composition (mol %) | |
|---|---|---|---|---|---|
| 9 | 20–22 | 8 | 217.8 | 94 | adduct II (n = 23) |
|  |  |  |  | 2 | PTHF |
|  |  |  |  | 1 | PTHF ester |
| 10 | 20–25 | 36 | 24,900 | 95 | adduct II (n = 3) |
|  |  |  |  | 5 | PTHF |
|  |  |  |  | 1 | PTHF ester |
| 11 | 20–24 | 22 | 94.0 | 97 | adduct II (n = 3) |
|  |  |  |  | 3 | PTHF |
|  |  |  |  | 2 | PTHF ester |
|  |  |  |  | 2 | PTHF |
|  |  |  |  | 1 | PTHF ester |

I claim:

1. A polyethercarboxylic ester of the general formula

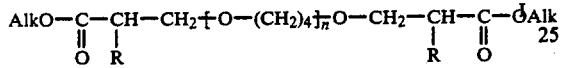

where Alk is alkyl of 1 to 8 carbon atoms, R is hydrogen or methyl and n is from 3 to 70.

2. A polyethercarboxylic ester of the general formula

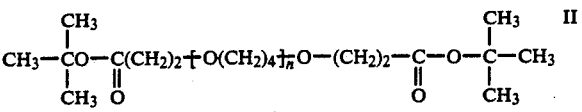 II where n has the meaning stated in claim 1.

3. A process for the preparation of a polyethercarboxylic ester as claimed in claim 1, wherein a polytetrahydrofuran of the general formula

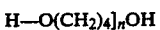 III where n is from 3 to 70, is reacted with an acrylate of the general formula

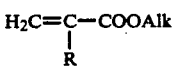 IV where Alk is alkyl of 1 to 8 carbon atoms and R is hydrogen or methyl, in the presence of a basic substance.

4. A process as claimed in claim 3, wherein the basic substance used is a quaternary ammonium or phosphonium compound.

* * * * *

UNITED STATES PATENT AND TRADEMARK OFFICE
CERTIFICATE OF CORRECTION

PATENT NO. : 5,034,559
DATED : July 23, 1991
INVENTOR(S) : Eckhard Hickmann

It is certified that error appears in the above-identified patent and that said Letters Patent is hereby corrected as shown below:

In the Abstract;

and Col. 1, lines 7-10; and

Col. 5, claim 1, lines 24-26

Correct the formula to read as follows:

--  I --.

Col. 1, line 28 and Col. 2, line 15, and

Col 6, claim 3, line 14;

Correct the formula to read as follows:

-- 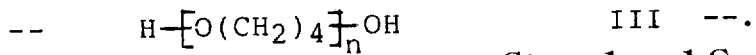 III --.

Signed and Sealed this

Twenty-second Day of December, 1992

Attest:

DOUGLAS B. COMER

Attesting Officer    Acting Commissioner of Patents and Trademarks